Patented Jan. 19, 1937

2,068,219

UNITED STATES PATENT OFFICE 2,068,219

WATER - RESISTANT PRODUCT AND METHOD OF MAKING THE SAME

Marion S. Badollet, Fanwood, N. J., assignor to Johns-Manville Corporation, New York, N. Y., a corporation of New York No Drawing. Application April 14, 1933, Serial No. 666,225

4 Claims. (Cl. 91—68)

This invention relates to a water-resistant product and method of making the same, particularly to particles comprising a slightly soluble compound of a multivalent metal and the reaction product of a soluble soap therewith.

There have been used heretofore water-resistant compositions comprising mechanical mixtures of soaps with other materials. Also, soap solutions have been used to clean the outer surface of various substances.

Briefly stated, the invention comprises the interaction of a soluble soap and particles of a slightly soluble silicate compound of a multivalent metal or the like adapted to react with the soluble soap to form an insoluble water-resistant soap compound. The invention comprises also the product of the interaction, including particles of silicate compound, for example, and insoluble soap formed in situ in the outer surface portions of the particles and constituting an integral, firmly bound part thereof.

In making the preferred type of composition, there are first provided particles of a slightly soluble compound of a multivalent metal adapted to react with a soluble soap to form an insoluble soap, say of lesser solubility in water than the said compound. The compound is then reacted with a soluble soap, to form the insoluble soap as a water-resistant ingredient of the particles of compound originally used. The resulting product is treated to remove therefrom undesired, readily water-soluble materials and is then subjected to drying to remove water.

The preferred compound for reaction with the soluble soap is a silicate possessing the properties described, as, for example, relatively highly hydrated silicates of calcium and magnesium. In the method of the present application, such silicates, in reacting with soluble soaps, form calcium or magnesium soaps by the replacement of silicate radical in the calcium or magnesium silicates by the radical of a soap, such as the stearate or oleate radical of a sodium soap.

Thus, there may be provided a hydrated calcium silicate, that is relatively soluble as compared, for example, with fused calcium silicate, by reacting comminuted diatomaceous earth with milk of lime in hot condition as described in U. S. Patent 1,574,363 issued to Calvert on February 23, 1926. The resulting product is filtered, washed with water, and then dried and milled to disintegrate lumps into fine particles. The product is then treated with a solution of soap in excess of the amount that will react with the calcium silicate in the surface portion of the particles, as, for example, with a solution of soap containing 3 parts by weight to 100 of water, or 2 to 3 parts of soap to 100 parts of the lime-treated diatomaceous earth product. The soap treatment is made suitably in luke warm condition, say at approximately 50° C., for a period of 15 minutes or longer.

During this treatment there is formed in situ, in the outer surface portions of the particles of calcium silicate, a substantial amount of water insoluble calcium soap. This soap is an integral part of the outer surface portion of the particles and is integrally bound therein so that it is not readily removed by washing or abrasion.

The resulting material is then filtered and subjected to thorough washing with water, suitably warm water, to dissolve out readily water-soluble materials present, including unused soap. It will be understood that water-soluble materials in the finished product would be highly undesirable, in the preferred embodiment of the invention, since such materials serve as media for the diffusion of water into a product which it is desired to have in waterproof or water-resistant form.

Using a different source of silicate of a multivalent metal, I apply the invention to certain types of asbestos fibers that are adapted to react to a substantial degree with a soluble soap, to form an amount of insoluble soap adequate to impart water resistance to the fibers. Such fibers include the relatively highly hydrated and/or relatively reactive forms such as chrysotile asbestos from Danville, Canada, or from Vermont, or tremolite, but exclude such relatively lowly hydrated (substantially non-hydrated) and relatively non-reactive forms as amosite and blue African fiber, the reactivity being rated on the basis of reactivity towards a solution of soap.

Asbestos of the preferred type, say chrysotile asbestos in the form of well dispersed, preferably short fibers, is treated with a soap solution containing 2 to 3 parts by weight of soap to 100 parts of water, the proportion of actual soap being approximately two and one-half parts to 100 parts of the asbestos fibers. The materials are allowed to react for sufficient time to permit practically complete reaction of the surface portions of the asbestos fiber with the soap, suitably at a temperature of approximately 50° C. or higher.

The reacted product is then subjected to treatment to remove readily water-soluble material therefrom, as by filtration and washing as described above. Finally the product is dried.

In drying products made in accordance with the present invention, the temperature of the drying should be below that of decomposition of soap present, say below 105° C. and suitably at temperatures below 75° C.

When it is desired to obtain more thorough impregnation of the asbestos fibers and a deeper zone of impregnation and reaction with the soap, means may be used to cause a soap solution to penetrate farther within the fibers. Thus, the soap solution may be forced under pressure into the fibers. Or, the asbestos being reacted upon may be subjected to a vacuum, to remove air from the pores therein, and then impregnated with the soap solution while still under the influence of the vacuum.

As ordinarily made, the product of the present invention will contain sufficient insoluble soap to render it resistant to penetration or quick wetting by water, say 3% of soap on the weight of the total dried product. This soap is an integral part of the product and not simply a mechanical mixture therewith or a superficial coating on the surface thereof. The precipitated or insoluble soap may extend practically continuously over the particles of base material and may also extend to an appreciable depth therein.

Products made as described are useful as fillers. Also, the water-resistant asbestos fibers may be used in making asbestos paper by conventional equipment and method or may be spun and fabricated into asbestos cloth. Thus, there may be made a cloth that is adapted to support liquid water applied to a surface thereof, without being wetted by the water for a substantial period of time.

The soap treatment may be given, as described, to fibers of reactive asbestos for use in various asbestos products, as, for example, in the mixture of asbestos and basic magnesium carbonate sold as "85% Magnesia" for thermal insulating purposes or in compositions of asbestos fibers and Portland cement, such as compressed and densified structural panels.

Also, the soap treatment may be applied to fabricated asbestos products such as asbestos cloth. In using the treatment with asbestos cloth, however, satisfactory penetration of the soap solution within the strands of asbestos comprising the fabric is obtained by special means. Thus a woven asbestos cloth may be subjected to a vacuum and, while being maintained under vacuum, is immersed in a warm soap solution. After the penetration and reaction are complete, the vacuum is broken and the resulting cloth is washed thoroughly with water to remove the excess of soap.

As stated, the present invention is applicable to the reactive forms of asbestos fibers. I have discovered a method by the use of which the relatively unreactive asbestos fibers such as amosite and blue African (crocidolite) may be converted to a reactive form and caused to react with soap in accordance with the invention.

The method of making such reactive material from initially unreactive fibers is illustrated by the treatment of the fibers at an elevated temperature and pressure with an aqueous mixture of an alkaline earth metal compound that is at least appreciably soluble in water. For most expeditious results, a carrier or catalyst is used.

Thus, there may be used 80 parts by weight of amosite fiber mixed with 40 parts of finely divided magnesium carbonate and 2 parts of sodium carbonate in 2,000 parts of water. The mixture is then heated in an autoclave at a temperature of approximately 430° F., which corresponds to a gauge pressure of approximately 350 lbs., the temperature and the corresponding pressure being increased gradually from atmospheric to the values stated, say in the course of about an hour's time. During this treatment there is an exchange of bases, some of the magnesium replacing some of the iron in the amosite fiber, the sodium carbonate acting as a carrier or catalyst. Finally the temperature and the pressure are lowered and the reaction mixture filtered, washed, and either dried or treated directly with the soap solution, as described above.

It is found that the reaction product of the amosite fibers and the alkali mixture contains a substantial amount of magnesium in the surface portions of the amosite fibers, probably partly chemically combined and partly physically adsorbed, is reactive to soap solution, and may be made water resistant by following the steps that have been previously described in the case of chrysotile asbestos.

The autoclaving with aqueous alkali may be given likewise to the blue African fibers of asbestos, and the product washed and soap treated to give water-resistant fibers.

It has been found that the autoclaving with aqueous alkali not only renders the initially unreactive fibers more reactive towards soap, but also modifies other properties of the fibers in a desirable manner. Thus, the autoclaving treatment with the alkaline earth metal compound decreases greatly the brittleness commonly observed in amosite and blue African asbestos fibers, for example.

In place of the mixture used above in the autoclaving treatment, there may be substituted other aqueous mixtures of solutions. Thus, there may be used to advantage aqueous solutions of soluble salts of alkaline earth metals, as, for example, magnesium sulphate or chloride, sodium carbonate or the like being used in small proportion as a catalyst. If desired, the autoclave treatment may be made in two steps, the first step including autoclaving with an aqueous solution of sodium carbonate or the like, after which treatment the resulting product, either with or without being filtered and washed, is then autoclaved with the aqueous alkaline earth metal compound.

While the preferred method involves the use of sodium carbonate, potassium carbonate, or other freely soluble alkali as a catalyst, the catalyst may be omitted if its accelerating effect is not desired.

The materials such as the crocidolite or amosite fibers or diatomaceous earth, after having been treated as described to make them reactive with an aqueous solution of a soap, may be described as hydrated or activated.

The term "multivalent" as applied to a metal indicates that the metal has two or more valences.

It will be evident that the methods used for imparting reactivity to diatomaceous earth and initially unreactive asbestos fibers are examples of the general method of treating siliceous material with an alkaline earth metal compound or the like adapted to react with the said siliceous material under the conditions of treatment.

The details that have been given are for the purpose of illustration and not restriction. Many variations therefrom within the scope of the appended claims may be made without departing from the spirit and scope of the invention.

What I claim is:

1. A water-resistant composition of matter comprising fibers and an insoluble soap disposed on the surface portions of the said fibers and integrally united thereto, the said fibers being selected from a group consisting of chrysotile asbestos, tremolite, activated crocidolite and activated amosite.

2. A composition of matter consisting mainly of chrysotile fibers and a water-insoluble soap disposed on the surface portions of the fibers, integrally united to the fibres, and imparting water-resistance thereto.

3. A composition of matter consisting mainly of activated crocidolite fibres and a water-insoluble soap disposed on the surface portions of the fibres, integrally united to the fibres, and imparting water-resistance thereto.

4. A composition of matter consisting mainly of activated amosite fibres and a water-insoluble soap disposed on the surface portions of the fibres, integrally united to the fibres, and imparting water-resistance thereto.

MARION S. BADOLLET.